United States Patent
Yang et al.

(10) Patent No.: US 12,432,717 B2
(45) Date of Patent: Sep. 30, 2025

(54) METHOD FOR UPLINK TRANSMISSION IN UNLICENSED BAND, TERMINAL, AND NETWORK DEVICE

(71) Applicant: VIVO MOBILE COMMUNICATION CO., LTD., Guangdong (CN)

(72) Inventors: Ang Yang, Guangdong (CN); Xiaodong Shen, Guangdong (CN); Xueming Pan, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 976 days.

(21) Appl. No.: 17/402,963

(22) Filed: Aug. 16, 2021

(65) Prior Publication Data

US 2021/0377982 A1   Dec. 2, 2021

Related U.S. Application Data

(63) Continuation of application No. PCT/CN2020/075254, filed on Feb. 14, 2020.

(30) Foreign Application Priority Data

Feb. 15, 2019 (CN) .......................... 201910118174.0

(51) Int. Cl.
  *H04W 72/1268* (2023.01)
  *H04W 72/23* (2023.01)

(52) U.S. Cl.
  CPC ....... *H04W 72/1268* (2013.01); *H04W 72/23* (2023.01)

(58) Field of Classification Search
  CPC . H04W 72/1268; H04W 72/23; H04W 72/54; H04W 74/0808; H04W 74/006; H04W 72/0446; H04W 72/0453; H04W 72/1263; H04W 72/232; H04W 8/24; H04W 16/14; H04W 72/21; H04L 5/0051; H04L 5/0094; H04L 27/0006
  See application file for complete search history.

(56) References Cited

U.S. PATENT DOCUMENTS

| | | | |
|---|---|---|---|
| 2016/0021661 A1 | 1/2016 | Yerramalli et al. |
| 2017/0026297 A1 | 1/2017 | Sun et al. |
| 2017/0094683 A1 | 3/2017 | Sun et al. |

(Continued)

FOREIGN PATENT DOCUMENTS

| | | | |
|---|---|---|---|
| CN | 105992343 A | 10/2016 |
| CN | 105992373 A | 10/2016 |

(Continued)

OTHER PUBLICATIONS

NTT Docomo, Inc., "Overall solutions for UL grant free transmission", 3GPP TSG RAN WG1 NR Ad-Hoc#2, R1-1711111, Qingdao, P.R. China Jun. 27-30, 2017.

(Continued)

*Primary Examiner* — Fred A Casca
(74) *Attorney, Agent, or Firm* — Price Heneveld LLP

(57) ABSTRACT

This disclosure discloses a method for uplink transmission in an unlicensed band, a terminal, and a network device. The method includes: sensing a scheduled resource to obtain a corresponding sensing result; and transmitting a transport block on the scheduled resource based on the sensing result.

18 Claims, 6 Drawing Sheets

(56) References Cited

U.S. PATENT DOCUMENTS

| | | |
|---|---|---|
| 2018/0027493 A1 | 1/2018 | Li et al. |
| 2018/0035429 A1* | 2/2018 | Jiaqing et al. |
| 2019/0174526 A1* | 6/2019 | Liu ....................... H04L 5/0094 |
| 2019/0246420 A1* | 8/2019 | Park ....................... H04W 72/23 |
| 2020/0008102 A1* | 1/2020 | Yokomakura ......... H04L 1/0003 |
| 2020/0053748 A1* | 2/2020 | Hosseini ............. H04W 72/569 |
| 2020/0221506 A1* | 7/2020 | Jeon .................. H04W 74/0808 |
| 2020/0236708 A1 | 7/2020 | Li et al. |
| 2021/0235487 A1* | 7/2021 | Park ..................... H04L 1/0068 |

FOREIGN PATENT DOCUMENTS

| | | |
|---|---|---|
| CN | 106538017 A | 3/2017 |
| CN | 107852274 A | 3/2018 |
| JP | 2018527799 A | 9/2018 |
| JP | 2018535586 A | 11/2018 |
| WO | 2016078396 A1 | 5/2016 |
| WO | 2017147515 A1 | 8/2017 |
| WO | 2017183866 A1 | 10/2017 |
| WO | 2017196160 A1 | 11/2017 |
| WO | 2018152985 A1 | 8/2018 |

OTHER PUBLICATIONS

Media Tek, Inc., "Remaining issues of DL/UL data scheduling and HARQ procedure", 3GPP TSG RAN WG1 Meeting #94, R1-1808261, Gothenburg, Sweden, Aug. 20-24, 2018.
Huawei, "Transmission with configured grant for NR-U", 3GPP TSG-RAN WG2 Meeting #104, R2-1816601, Spokane, US, Nov. 12-16, 2018.

* cited by examiner

METHOD FOR UPLINK TRANSMISSION IN UNLICENSED BAND, TERMINAL, AND NETWORK DEVICE

CROSS-REFERENCE TO RELATED APPLICATIONS

This application is a continuation application of International Application No. PCT/CN2020/075254 filed on Feb. 14, 2020, which claims priority to Chinese Patent Application No. 201910118174.0, filed in China on Feb. 15, 2019, both disclosures of which are incorporated herein by reference in their entireties.

TECHNICAL FIELD

This disclosure relates to the field of communications technologies, and in particular, to a method for uplink transmission in an unlicensed band, a terminal, and a network device.

BACKGROUND

In a 5G (5G) mobile communications system, before transmitting information in an unlicensed band, a terminal or a network device needs to perform clear channel assessment (CCA) or extended clear channel assessment (eCCA) for channel sensing, which means performing energy detection (ED). Transmission cannot be started until a channel is determined to be idle when energy is lower than a specified threshold. Because an unlicensed band is shared by a plurality of technologies or transmission nodes, such contention-based access mode causes uncertainty of when a channel is available. Currently, three categories of listen before talk (LBT) can be used in 5G unlicensed communications systems: LBT category 1 (LBT Cat 1), in which direct transmission is performed without any CCA, and which can be used only in a case that a channel has been obtained and that a transmission switching gap is less than 16 us; LBT category 2 (LBT Cat 2), in which 25 us sensing is performed on a channel, and which can be used for obtaining channels for specific signals, with a maximum continuous transmission duration less than a specified value, such as 1 ms; and LBT category 3 (LBT Cat 3), in which channel sensing with random backoff is performed, and maximum transmission duration after a channel is finally obtained varies with priority parameter settings.

Further, to ensure continuous transmission in the unlicensed band for the terminal, the network device may schedule a plurality of consecutive slots, or transmission time intervals (TTI), for the terminal in one uplink grant (UL grant), where all TTIs share one set of transmission parameters, but different TTIs correspond to separate transport blocks (TB) and separate hybrid automatic repeat request (HARD) process IDs.

When a 5G system is operating in a wide band including a plurality of LBT subbands, for example, greater than 20 MHz, before performing uplink data transmission, a terminal needs to perform LBT in each 20 MHz subband, and transmission can be performed only in a subband with successful LBT. However, after receiving an UL grant, the terminal calculates a TB size and prepares data based on indication in downlink control information (DCI). In a case that part of scheduled resources cannot be used for transmission due to LBT failure, this part of data needs to be punctured. As shown in FIG. 1, LBT performed by the terminal before slot 1 fails, so data originally mapped to subband 3 (subband#3) cannot be transmitted in all scheduled TTIs, the plurality of scheduled TTIs need to be punctured, and data corresponding to those TTIs may all need to be retransmitted, which greatly reduces transmission efficiency of the system.

SUMMARY

According to a first aspect, an embodiment of this disclosure provides a method for uplink transmission in an unlicensed band, applied to a terminal and including:
sensing a scheduled resource to obtain a corresponding sensing result; and
transmitting a transport block on the scheduled resource based on the sensing result.

According to a second aspect, an embodiment of this disclosure further provides a terminal, including:
a sensing module, configured to sense a scheduled resource to obtain a corresponding sensing result; and
a first transmitting module, configured to transmit a transport block on the scheduled resource based on the sensing result.

According to a third aspect, an embodiment of this disclosure provides a terminal, where the terminal includes a processor, a memory, and a computer program stored in the memory and running on the processor, and when the computer program is executed by the processor, the steps of the foregoing method for uplink transmission in an unlicensed band are implemented.

According to a fourth aspect, an embodiment of this disclosure provides a method for uplink transmission in an unlicensed band, applied to a network device and including:
receiving a transport block on a scheduled resource.

According to a fifth aspect, an embodiment of this disclosure provides a network device, including:
a second receiving module, configured to receive a transport block on a scheduled resource.

According to a sixth aspect, an embodiment of this disclosure further provides a network device, where the network device includes a processor, a memory, and a computer program stored in the memory and running on the processor, and when the computer program is executed by the processor, the steps of the foregoing method for uplink transmission in an unlicensed band are implemented.

According to a sixth aspect, an embodiment of this disclosure provides a computer-readable storage medium, where the computer-readable storage medium stores a computer program, and when the computer program is executed by a processor, the steps of the foregoing method for uplink transmission in an unlicensed band are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from these accompanying drawings.

DESCRIPTION OF EMBODIMENTS

Figure 1:
FIG. 1 is a schematic transmission diagram of a transport block in an unlicensed band transmission scenario in the related art.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to persons skilled in the art.

The terms "first", "second", and the like in this specification and claims of this disclosure are used to distinguish between similar objects instead of describing a specific order or sequence. It should be understood that the data used in this way is interchangeable in appropriate circumstances, so that the embodiments of this disclosure described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" are usually used interchangeably. The CDMA system can implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (for example, LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may also be applied to other systems than the NR system.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 2:
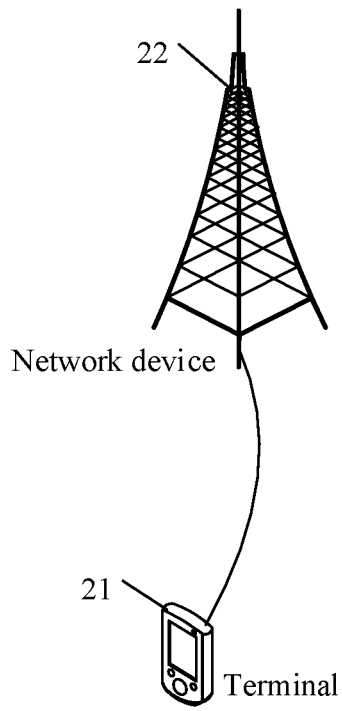
FIG. 2 is a block diagram of a mobile communications system to which an embodiment of this disclosure may be applied.

FIG. 2 is a block diagram of a wireless communications system applicable to an embodiment of this disclosure. The wireless communications system includes a terminal 21 and a network device 22. The terminal 21 may also be referred to as a terminal device or user equipment (UE). The terminal 21 may be a terminal side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 21 is not limited in the embodiments of this disclosure. The network device 22 may be a base station or a core network, where the base station may be a base station of 5G or a later version (for example, a gNB or a 5G NR NB), or a base station in other communications systems (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or another appropriate term in the art. As long as the same technical effect is achieved, the base station is not limited to a specific technical term. It should be noted that only the base station in the NR system is taken as an example in the embodiments of this disclosure, but a specific type of the base station is not limited.

The base station may communicate with the terminal 21 under the control of a base station controller. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be transmitted on different carriers and may carry control information (for example, a reference signal or a control channel), overhead information, data, and the like.

The base station may communicate wirelessly with the terminal 21 through one or more access point antennas. Each base station may provide communication coverage for a corresponding coverage area of the base station. A coverage area of an access point may be divided into sectors forming only part of the coverage area. The wireless communications system may include different types of base stations (for example, a macro base station, a micro base station, and a picocell base station). The base station may also use different radio technologies, such as cellular and WLAN radio access technologies. The base station may be associated with a same access network or operator deployment or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 21 to the network device 22), or a downlink for carrying a downlink (DL) transmission (for example, from the network device 22 to the terminal 21). The UL transmission may also be referred to as reverse link transmission, and the DL transmission may also be referred to as forward link transmission. A licensed band, an unlicensed band, or both may be used for the downlink transmission. Similarly, a licensed band, an unlicensed band, or both may be used for the uplink transmission.

Figure 3:
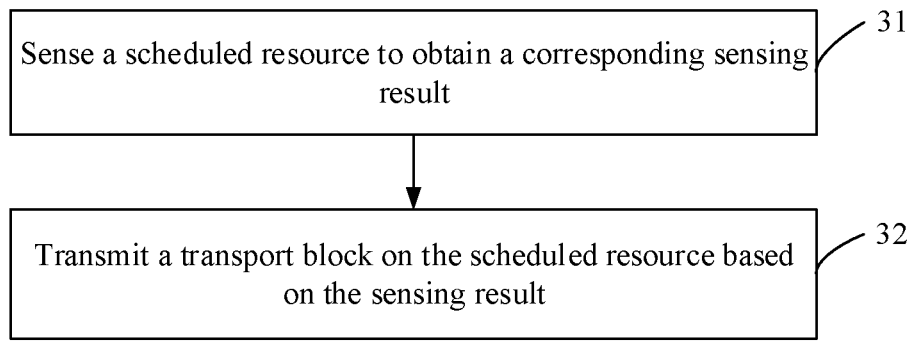
FIG. 3 is a schematic flowchart of a method for uplink transmission in an unlicensed band on a terminal side according to an embodiment of this disclosure.

An embodiment of this disclosure provides a method for uplink transmission in an unlicensed band, applied to a terminal side. As shown in FIG. 3, the method includes the following steps:

Step 31: Sense a scheduled resource to obtain a corresponding sensing result.

The scheduled resource in this embodiment of this disclosure may include a plurality of subbands. For example, the scheduled resource includes subband 1 (subband#1), subband 2 (subband#2), subband 3 (subband#3), and subband 4 (subband#4). The scheduled resource may alternatively include a plurality of time domain transmission units (for example, slots). For example, the scheduled resource includes: slot 1 (slot#1), slot 2 (slot#2), slot 3 (slot#3), and slot 4 (slot#4). The scheduled resource may be a dynamic scheduled resource or a semi-persistent scheduled resource. After obtaining the scheduled resource, the terminal needs to sense the scheduled resource before transmitting information on the scheduled resource. Optionally, before the first slot of the scheduled resource, the terminal separately senses a plurality of subbands of the scheduled resource, to obtain respective sensing results of all the subbands. If the terminal performs sensing in the first slot of the scheduled resource and determines that sensing for all subbands in the first slot fails, the terminal continues to perform sensing in the second slot of the scheduled resource, and starts uplink transmission on the scheduled resource only after sensing for at least one subband in a slot succeeds.

Step 32: Transmit a transport block on the scheduled resource based on the sensing result.

In a case that sensing for at least one subband in a slot of the scheduled resource succeeds, the terminal determines a to-be-transmitted transport block based on sensing results of all subbands in the scheduled resource, and transmits the corresponding transport block on the scheduled resource. The transport block is transmitted based on the sensing result of the scheduled resource, making transmission of the transport block more flexible, and improving transmission efficiency of the transport block in this scenario.

Before step 31, the method further includes: receiving first downlink control information DCI used to indicate the scheduled resource.

The first downlink control information (DCI) carries resource indication information for scheduling a scheduled resource.

This embodiment of this disclosure further describes an implementation of how to transmit a transport block on the scheduled resource based on the sensing result with reference to examples below. It should be noted that an implementation of step 32 includes but is not limited to the following manners.

Manner 1: A network device transmits new DCI to overwrite a scheduling parameter in the previously transmitted DCI.

Figure 4:
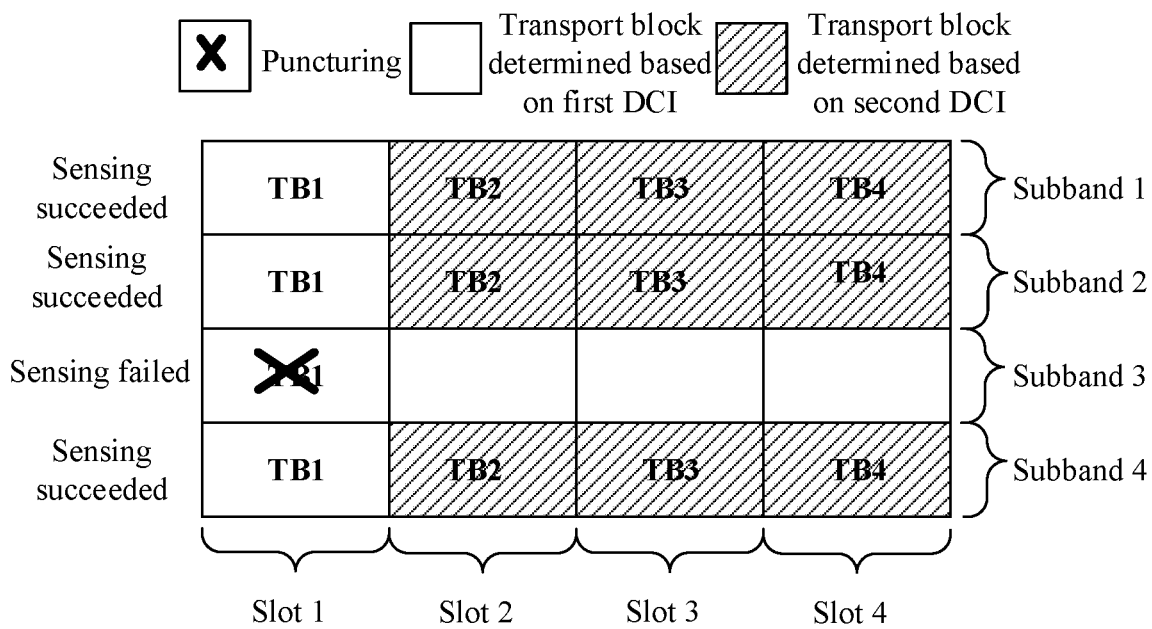
FIG. 4 is a schematic transmission diagram of a transport block in a first embodiment of this disclosure.

This manner is suitable for a non-independent scenario, and step 32 includes: receiving second downlink control information DCI from a network device, where the second DCI carries an updated uplink scheduling parameter; and transmitting the transport block on the scheduled resource based on the updated uplink scheduling parameter in the second DCI. In other words, the network device may change an uplink scheduling parameter for the terminal in the scheduled resource by transmitting new DCI. As shown in FIG. 4, the terminal senses subbands 1 to 4 in slot 1 of the scheduled resource, and determines that subband 1, subband 2, and subband 4 are available and subband 3 is unavailable. The terminal prepares data in slot 1 based on the first DCI, meaning that the terminal maps data to subbands 1 to 4 in slot 1 to form a transport block (TB) 1. However, because subband 3 is unavailable, the terminal performs puncturing for subband 3. Correspondingly, the network device receives TB1 based on the uplink scheduling parameter in the first DCI.

The second DCI is triggered by the network device based on a received demodulation reference signal (DMRS) in the scheduled resource. In other words, the network device obtains, by detecting a DMRS in a previous transmission slot, information indicative of successful subband sensing by the terminal, and transmits the second DCI on another carrier to adjust an uplink scheduling parameter. As shown in FIG. 4, after receiving TB1, if the network device detects its DMRS and determines that subband 3 is unavailable, the network device transmits the second DCI to the terminal to adjust uplink scheduling parameters for subsequent scheduled resources. As shown in FIG. 4, subband 1, subband 2, and subband 4 in slots 2 to 4 of the scheduled resource are used as scheduled resources. The terminal prepares data based on the second DCI. In other words, the terminal maps the data to subband 1, subband 2, and subband 4 in slot 2 to form TB2, maps the data to subband 1, subband 2, and subband 4 in slot 3 to form TB3, and maps data to subband 1, subband 2, and subband 4 in slot 4 to form TB4. The terminal does not need to perform puncturing for the transport block during transmission. Correspondingly, the network device receives TB2, TB3, and TB4 based on the uplink scheduling parameter in the second DCI.

Alternatively, the second DCI is triggered by the network device based on the received first uplink control information (UCI) in the scheduled resource, where the first UCI carries the sensing result. In other words, the terminal adds the first UCI into the transport block in the previous transmission slot, and the network device obtains, from the first UCI, information that can be used to determine the successful subband sensing by the terminal, and then transmits the second DCI on another carrier to adjust an uplink scheduling parameter. As shown in FIG. 4, after the network device receives TB1, if the first UCI carried in TB1 indicates that subband 3 is unavailable, the network device transmits the second DCI to the terminal to adjust uplink scheduling parameters for subsequent scheduled resources. As shown in FIG. 4, subband 1, subband 2, and subband 4 in slots 2 to 4 of the scheduled resource are used as scheduled resources. The terminal prepares data based on the second DCI. In other words, the terminal maps the data to subband 1, subband 2, and subband 4 in slot 2 to form TB2, maps the data to subband 1, subband 2, and subband 4 in slot 3 to form TB3, and maps data to subband 1, subband 2, and subband 4 in slot 4 to form TB4. The terminal does not need to perform puncturing for the transport block during transmission. Correspondingly, the network device receives TB2, TB3, and TB4 based on the uplink scheduling parameter in the second DCI.

Manner 2: The network device explicitly indicates or implicitly prescribes that the terminal updates the transport block at an update time.

In this manner, the terminal transmits the transport block on the scheduled resource based on the sensing result and the first DCI. Specifically, the first DCI may include but is not limited to at least one of modulation and coding scheme (MCS) indication information (for example, an MCS index), time domain resource allocation (TDRA) indication information, frequency domain resources allocation (FDRA) indication information, a transport block scaling factor, or the number of consecutively scheduled slots.

Specifically, step 32 includes: separately transmitting a first transport block and a second transport block on the scheduled resource based on the sensing result, the first DCI, and an update time, where the update time is associated with the sensing result. The update time in this embodiment may be carried in the first DCI, or the update time may be determined based on a terminal capability.

In a case that the first DCI does not include the transport block scaling factor, the first transport block is determined based on the MCS indication information, the TDRA indication information, and the FDRA indication information. Alternatively, in a case that the first DCI includes the transport block scaling factor, the first transport block is determined based on the MCS indication information, the TDRA indication information, the FDRA indication information, and the transport block scaling factor.

The foregoing describes a rule for mapping the first transport block, and the following further descries a rule for mapping the second transport block. The second transport block is determined based on the MCS indication information, the TDRA indication information, the FDRA indication information, and the sensing result.

In this manner, the step of separately transmitting a first transport block and a second transport block on the scheduled resource based on the sensing result, the first DCI, and an update time includes: in a case that the sensing result indicates that sensing for at least part of the scheduled resource succeeds, transmitting the first transport block in the first (n+i−1) slots of the scheduled resource; and transmitting the second transport block in the $(n+i)^{th}$ to $N^{th}$ slots of the scheduled resource; where n is the update time, i is the first slot, of the scheduled resource, in which sensing succeeds, N is the number of slots included in the scheduled resource, and n, i, and N are all integers. In other words, in this manner, in a case that the terminal detects that a subband is available in the scheduled resource, the terminal separately transmits the first transport block and the second transport block based on a slot corresponding to the first available subband and the update time, where the first transport block is a transport block before update, and the second transport block is a transport block after update.

Figure 5:
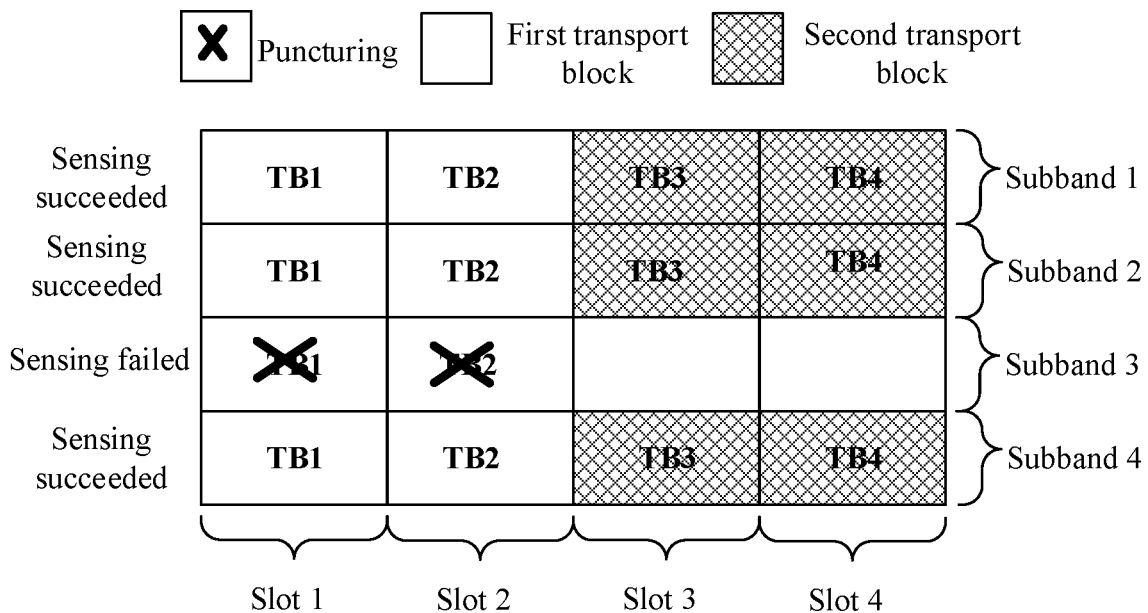
FIG. 5 is a schematic transmission diagram of a transport block in a second embodiment of this disclosure.

As shown in FIG. 5, the terminal senses subbands 1 to 4 in slot 1 of the scheduled resource, and determines that subband 1, subband 2, and subband 4 are available and subband 3 is unavailable. Assuming N=4, i=1, and n=2, the terminal prepares data in the first (n+i−1=2+1−1=2) slots of the scheduled resource based on the first DCI. Specifically, in a case that the first DCI does not indicate a transport block scaling factor, the terminal calculates a size of the first transport block based on MCS, TDRA, and FDRA indicated in the first DCI. If the first DCI indicates a scaling factor s, the terminal calculates a size of the first transport block based on MCS, TDRA, FDRA, and the scaling factor s indicated in the first DCI, for example, TB1=TB×s. Based on the determined size of the first transport block, the terminal maps the data to subbands 1 to 4 in slot 1 to form TB1, and maps the data to subbands 1 to 4 in slot 2 to form a transport block TB2. However, because subband 3 is unavailable, the terminal performs puncturing for subband 3 during transmission. Correspondingly, the network device receives TB1 and TB2 based on the uplink scheduling parameter in the first DCI.

Further, the terminal prepares data in the $(n+i)^{th}$ to $N^{th}$ slots, that is, the $3^{rd}$ and $4^{th}$ slots, of the scheduled resource based on the sensing result and the first DCI. Specifically, the terminal comprehensively calculates a size of the second transport block based on a condition of a subband successfully sensed and resource indication in the first DCI, and based on the determined size of the second transport block, maps the data to subband 1, subband 2, and subband 4 in slot 3 to form TB3, and maps the data to subband 1, subband 2, and subband 4 in slot 4 to form TB4. The terminal does not need to perform puncturing for the transport block during transmission. Correspondingly, the network device receives TB3 and TB4 based on the uplink scheduling parameter in the first DCI and the sensing result. Specifically, the network device needs to pre-determine which slots and subbands have data transmission before the receiving, perform decoding in the first (n+i−1) slots of the scheduled resource by using MCS indicated in the first DCI and the determined size of the first transport block, and perform decoding in a subsequent slot by using MCS indicated in the first DCI and the determined size of the second transport block.

Manner 3: The terminal autonomously adjusts an uplink scheduling parameter for the scheduled resource based on the sensing result, and adds UCI specially used to indicate the uplink scheduling parameter for the scheduled resource into the transport block.

The transport block transmitted by the terminal carries second UCI, and the second UCI includes at least one of transmission resource indication information, indication information for indicating whether to perform puncturing, a transport block scaling factor, or indication information for indicating whether a transport block is to be adjusted in the next slot.

In a case that the second UCI includes the indication information for indicating whether to perform puncturing and that the indication information indicates that no puncturing is to be performed, the transport block is associated with the sensing result. Specifically, in this case, the transport block may be jointly determined based on a configured uplink scheduling parameter and the sensing result.

In a case that the second UCI includes the indication information for indicating whether to perform puncturing and that the indication information indicates that puncturing is to be performed, the transport block is associated with the configured uplink scheduling parameter. Specifically, in this case, the transport block may be determined based on the configured uplink scheduling parameter.

Further, the transmission resource indication information in the second UCI is used to indicate: available or unavailable subband, updated FDRA, updated TDRA, and the like. In a case that the information for indicating whether a transport block is to be adjusted in the next slot indicates that no adjustment is performed, the network device does not need to demodulate the second UCI in the next slot. In a case that the information indicates that adjustment is to be performed, the network device needs to demodulate the second UCI in the next slot, and receive the transport block based on indication in the second UCI.

In this manner, the terminal autonomously determines the uplink scheduling parameter on the scheduled resource based on the sensing result. Step 32 includes: in a case that the sensing result indicates that sensing for at least part of the scheduled resource fails, separately transmitting the first transport block and the second transport block on the scheduled resource. The sizes of the second transport block and the first transport block may be the same or different. In other words, when sensing performed by the terminal for at least part of the scheduled resource fails, the terminal may autonomously determine whether to adjust the uplink scheduling parameter for the scheduled resource. If the uplink scheduling parameter is adjusted, the size of the second transport block is different from the size of the first transport block; and if the uplink scheduling parameter is not adjusted, the size of the second transport block is the same as the size of the first transport block.

In this manner, the method for determining the sizes of the first transport block and the second transport block may be the same as the determining method in Manner 2. However, in this manner, the transport block scaling factor may be determined or selected by the terminal autonomously. The first transport block is determined based on the MCS indication information, the TDRA indication information, and the FDRA indication information, or the first transport block is determined based on the MCS indication information, the TDRA indication information, the FDRA indication information, and the transport block scaling factor. The second transport block is associated with the sensing result. Specifically, the second transport block may be jointly determined based on the MCS indication information, the TDRA indication information, the FDRA indication information, and the sensing result.

Figure 6:
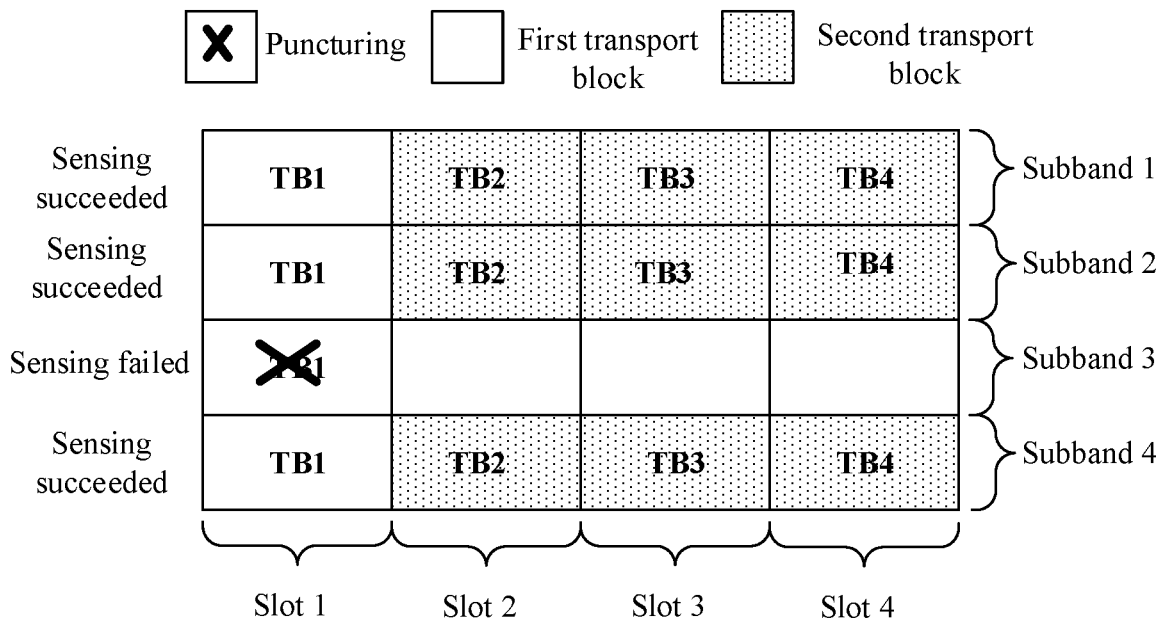
FIG. 6 is a schematic transmission diagram of a transport block in a third embodiment of this disclosure.

As shown in FIG. 6, the terminal senses subbands 1 to 4 in slot 1 of the scheduled resource, and determines that subband 1, subband 2, and subband 4 are available and subband 3 is unavailable. The terminal may determine a time point of transmission change depending on a capability, and notify the network device of update of the data transmission based on the second UCI. For example, the terminal may autonomously determine to prepare data in slot 1 of the scheduled resource based on the first DCI. Specifically, the terminal calculates a size of the first transport block based on MCS, TDRA, and FDRA indicated in the first DCI, or the terminal calculates a size of the first transport block based on MCS, TDRA, and FDRA indicated in the first DCI and an autonomously determined or selected scaling factor s, for example, TB1=TB×s. Based on the determined size of the first transport block, the terminal maps the data to subbands 1 to 4 in slot 1 to form TB1. Further, the terminal prepares the data in subsequent scheduled resources, that is, the $2^{nd}$ and $4^{th}$ slots, based on the sensing result and the first DCI. Specifically, the terminal comprehensively calculates a size of the second transport block based on a condition of a subband successfully sensed and resource indication in the first DCI, and based on the determined size of the second transport block, the terminal maps data to subband 1, subband 2, and subband 4 in slot 2 to form TB2; maps the data to subband 1, subband 2, and subband 4 in slot 3 to form TB3; and maps the data to subband 1, subband 2, and subband 4 in slot 4 to form TB4. The terminal does not need to perform puncturing for the transport block during transmission.

In this manner, the uplink scheduling parameter for transmitting the transport block on the scheduled resource is autonomously determined by the terminal based on the sensing result. Therefore, when transmitting the first transport block and the second transport block in the foregoing manner, the terminal adds the second UCI into the first transport block or the second transport block, where the terminal configures different second UCI that maps to specific locations in different slots based on the sensing result and a terminal capability, to indicate data preparation statuses in the corresponding slots, that is, transport blocks. The second UCI includes at least one of transmission resource indication information, indication information for indicating whether to perform puncturing, a transport block scaling factor, or indication information for indicating whether a transport block is to be adjusted in the next slot. The transmission resource indication information is used to indicate: available or unavailable subband, updated FDRA, updated TDRA, and the like. In a case that the information for indicating whether a transport block is to be adjusted in the next slot indicates that no adjustment is performed, the network device does not need to demodulate the second UCI in the next slot. In a case that the information indicates that adjustment is to be performed, the network device needs to demodulate the second UCI in the next slot, and receive the transport block based on indication in the second UCI.

Manner 4: The terminal performs slot aggregation based on the sensing result, and transmits a slot-aggregated transport block on the scheduled resource.

In this manner, the terminal performs slot aggregation based on the sensing result, and transmits data in one slot in a plurality of slots based on rate matching, so that even when some subbands in a slot are unavailable, preparing data at the original rate matching does not result in resource insufficiency. Specifically, step 32 includes: in a case that the sensing result indicates that sensing for at least part of the scheduled resource fails, performing slot aggregation for the scheduled resource; and transmitting a slot-aggregated transport block.

In this manner, the terminal calculates a size of the transport block and prepares data based on indication in the first DCI. If the terminal determines, when sensing the scheduled resource, that sensing for at least part of the scheduled resource fails, the terminal performs slot aggregation. A slot aggregation parameter used for slot aggregation may be explicitly indicated in third UCI or be calculated based on a given rule. Performing calculation based on a given rule is used as an example. For example, if the first DCI indicates that the number of scheduled physical resource blocks (PRB) is m1, and the sensing result indicates that the number of PRBs available in the scheduled resource is m2, the slot aggregation parameter may be [m1/m2].

Figure 7:
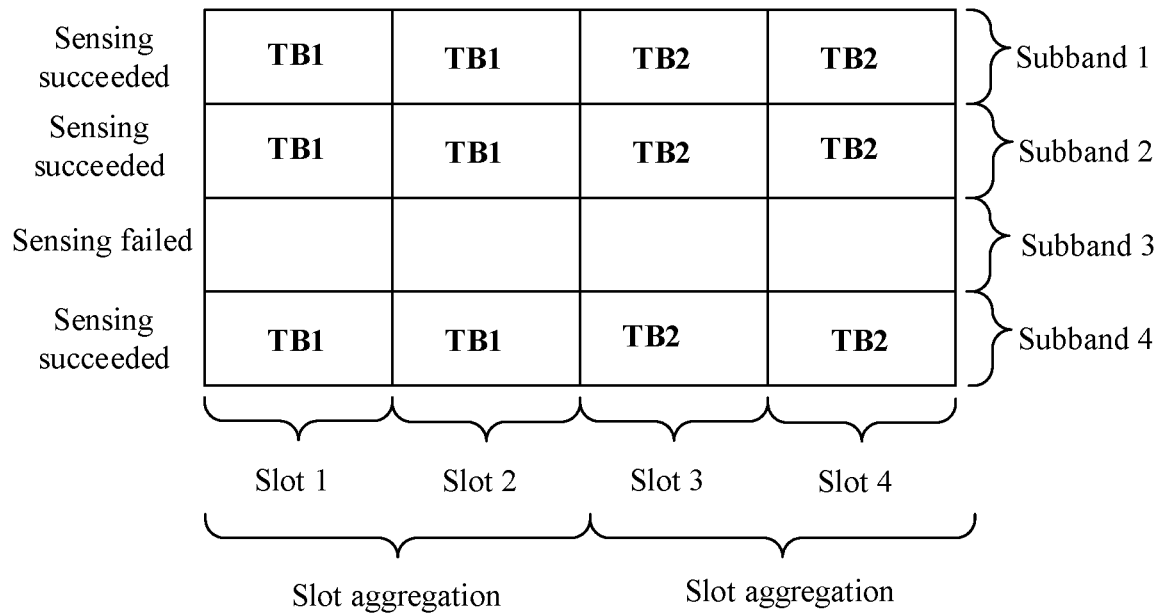
FIG. 7 is a schematic transmission diagram of a transport block in a fourth embodiment of this disclosure.

That the terminal autonomously determines an aggregation parameter is used as an example. As shown in FIG. 7, the terminal senses subbands 1 to 4 in slot 1 of the scheduled resource, and determines that subband 1, subband 2, and subband 4 are available and subband 3 is unavailable. The terminal performs slot aggregation by using a slot aggregation parameter of 2, that is, to perform aggregation every two slots. The terminal prepares data in the scheduled resource based on a size of the slot-aggregated transport block. Specifically, the terminal maps the data to subband 1, subband 2, and subband 4 in slot 1 and slot 2 to form TB1, and maps the data to subband 1, subband 2, and subband 4 in slot 3 and slot 4 to form TB2.

The slot aggregation parameter used for slot aggregation may be autonomously determined by the terminal. In this scenario, the transport block transmitted by the terminal carries the third UCI, and the third UCI includes: the slot aggregation parameter used for slot aggregation.

Further, in addition to being autonomously determined by the terminal and determined based on a given rule, the slot aggregation parameter used for slot aggregation may also be predefined, for example, prescribed in a protocol. Alternatively, the slot aggregation parameter may be configured by the network device to the terminal, for example, configured by the network device by using radio resource control (RRC) signaling or broadcast signaling.

Manner 5: The terminal retransmits the transport block in a plurality of slots of the scheduled resource, and adds the UCI specially used to indicate the retransmission into the transport block.

In this manner, the terminal autonomously determines, based on the sensing result, whether to retransmit the transport block in the scheduled resource, so as to reduce data transmission delay. Specifically, step 32 includes: in a case that the sensing result indicates that sensing for at least part of the scheduled resource fails, performing initial transmission of the transport block on a first part of the scheduled resource; and performing retransmission of the transport block on a second part of the scheduled resource.

Figure 8:
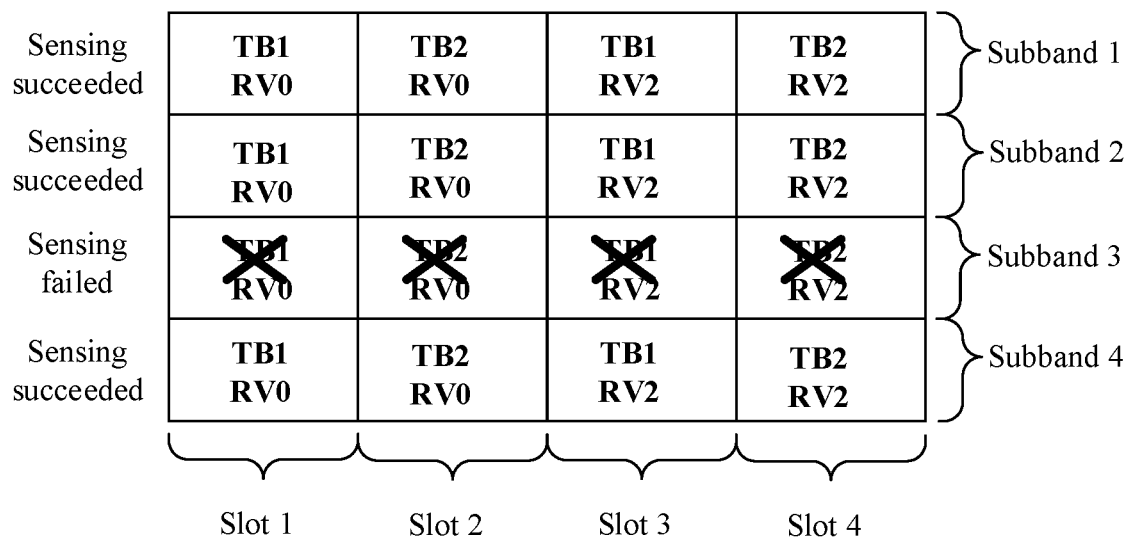
FIG. 8 is a schematic transmission diagram of a transport block in a fifth embodiment of this disclosure.

In this manner, if the terminal determines, when sensing the scheduled resource, that sensing for at least part of the scheduled resource fails, the terminal performs initial transmission of the transport block on a part of the scheduled resource, and performs retransmission of the transport block on another part of the resource. As shown in FIG. 8, the terminal senses subbands 1 to 4 in slot 1 of the scheduled resource, and determines that subband 1, subband 2, and subband 4 are available and subband 3 is unavailable. The terminal prepares data in the scheduled resource based on the first DCI. However, because the subband 3 is unavailable, the terminal performs puncturing for subband 3 during transmission, which causes the transmitted data to be incomplete. To reduce transmission delay of this part of the data, the terminal may map the data to subbands 1 to 4 in slot 1 to form TB1, and map the data to subbands 1 to 4 in slot 2 to form TB2. The retransmitted data of TB1 is mapped to subbands 1 to 4 in slot 3; and the retransmitted data of TB2 is mapped to subbands 1 to 4 in slot 4. Further, to ensure data integrity, redundancy versions (RV) used in initial transmission and retransmission of the transport block are different. As shown in FIG. 8, RV0 is used for the initial transmission, and RV2 is used for the retransmission.

In this scenario, the terminal autonomously determines whether to retransmit the transport block. Therefore, to ensure correct demodulation by the network device, the transport block transmitted by the terminal carries fourth UCI. The fourth UCI includes at least one of hybrid automatic repeat request (HARQ) identification information or redundancy version identification information.

In the method for uplink transmission in an unlicensed band according to this embodiment of this disclosure, in the unlicensed band transmission scenario in which a scheduled resource includes a plurality of slots, the terminal may transmit the transport block based on the sensing result of the scheduled resource, making transmission of the transport block more flexible, and improving transmission efficiency of the transport block in this scenario.

The foregoing embodiment separately describes in detail the method for uplink transmission in an unlicensed band in different scenarios. The following embodiments further describe a terminal corresponding to the method for uplink transmission in an unlicensed band with reference to an accompanying drawing.

Figure 9:
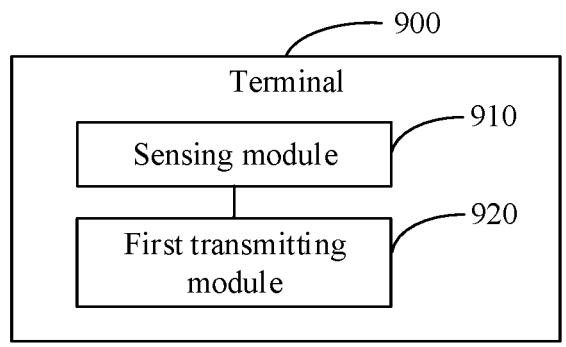
FIG. 9 is a schematic modular structure diagram of a terminal according to an embodiment of this disclosure.

As shown in FIG. 9, a terminal 900 according to an embodiment of this disclosure can implement the method details in the foregoing embodiment of sensing a scheduled resource to obtain a corresponding sensing result, and transmitting a transport block on the scheduled resource based on the sensing result, with the same effect achieved. The terminal 900 specifically includes the following functional modules:

a sensing module 910, configured to sense a scheduled resource to obtain a corresponding sensing result; and a first transmitting module 920, configured to transmit a transport block on the scheduled resource based on the sensing result.

The terminal 900 further includes:

a first receiving module, configured to receive first downlink control information DCI used to indicate the scheduled resource.

The first transmitting module 920 includes:

a first receiving submodule, configured to receive second downlink control information DCI from a network device, where the second DCI carries an updated uplink scheduling parameter; and a first transmitting submodule, configured to transmit a transport block on the scheduled resource based on the updated uplink scheduling parameter in the second DCI; where the second DCI is triggered by the network device based on a received demodulation reference signal DMRS in the scheduled resource; or the second DCI is triggered by the network device based on received first uplink control information UCI in the scheduled resource, where the first UCI carries the sensing result.

The first DCI includes at least one of modulation and coding scheme MCS indication information, time domain resource allocation TDRA indication information, frequency domain resource allocation FDRA indication information, a transport block scaling factor, or the number of consecutively scheduled slots.

The first transmitting module 920 further includes:

a second transmitting submodule, configured to separately transmit a first transport block and a second transport block on the scheduled resource based on the sensing result, the first DCI, and an update time, where the update time is associated with the sensing result.

The update time is carried in the first DCI, or the update time is determined based on a terminal capability.

In a case that the first DCI does not include the transport block scaling factor, the first transport block is determined based on the MCS indication information, the TDRA indication information, and the FDRA indication information; or in a case that the first DCI includes the transport block scaling factor, the first transport block is determined based on the MCS indication information, the TDRA indication information, the FDRA indication information, and the transport block scaling factor.

The second transport block is determined based on the MCS indication information, the TDRA indication information, the FDRA indication information, and the sensing result.

The second transmitting submodule includes:

a first transmitting unit, configured to, in a case that the sensing result indicates that sensing for at least part of the scheduled resource succeeds, transmit the first transport block in the first (n+i−1) slots in the scheduled resource; and a second transmitting unit, configured to transmit the second transport block in the $(n+i)^{th}$ to $N^{th}$ slots in the scheduled resource; where n is the update time, i is the first slot in which sensing succeeds, N is the number of slots included in the scheduled resource, and n, i, and N are all integers.

The transport block carries second UCI, and the second UCI includes at least one of transmission resource indication information, indication information for indicating whether to perform puncturing, a transport block scaling factor, or indication information for indicating whether a transport block is to be adjusted in the next slot.

In a case that the second UCI includes the indication information for indicating whether to perform puncturing and that the indication information indicates that no puncturing is to be performed, the transport block is associated with the sensing result.

The first transmitting module 920 further includes:

an aggregation submodule, configured to, in a case that the sensing result indicates that sensing for at least part of the scheduled resource fails, perform slot aggregation for the scheduled resource; and a fourth transmitting submodule, configured to transmit a slot-aggregated transport block.

The transport block carries third UCI, and the third UCI includes a slot aggregation parameter used for slot aggregation.

A slot aggregation parameter used for slot aggregation is predefined.

The first transmitting module 920 further includes:

a fifth transmitting submodule, configured to, in a case that the sensing result indicates that sensing for at least part of the scheduled resource fails, perform initial transmission of the transport block in a first part of the scheduled resource; and a sixth transmitting submodule, configured to perform retransmission of the transport block in a second part of the scheduled resource.

The transport block carries fourth UCI, and the fourth UCI includes at least one of hybrid automatic repeat request HARQ identification information or redundancy version identification information.

It should be noted that, in the unlicensed band transmission scenario in which a scheduled resource includes a plurality of slots, the terminal according to this embodiment of this disclosure can transmit a transport block based on a sensing result of the scheduled resource, making transmission of the transport block more flexible, and improving transmission efficiency of the transport block in this scenario.

Figure 10:
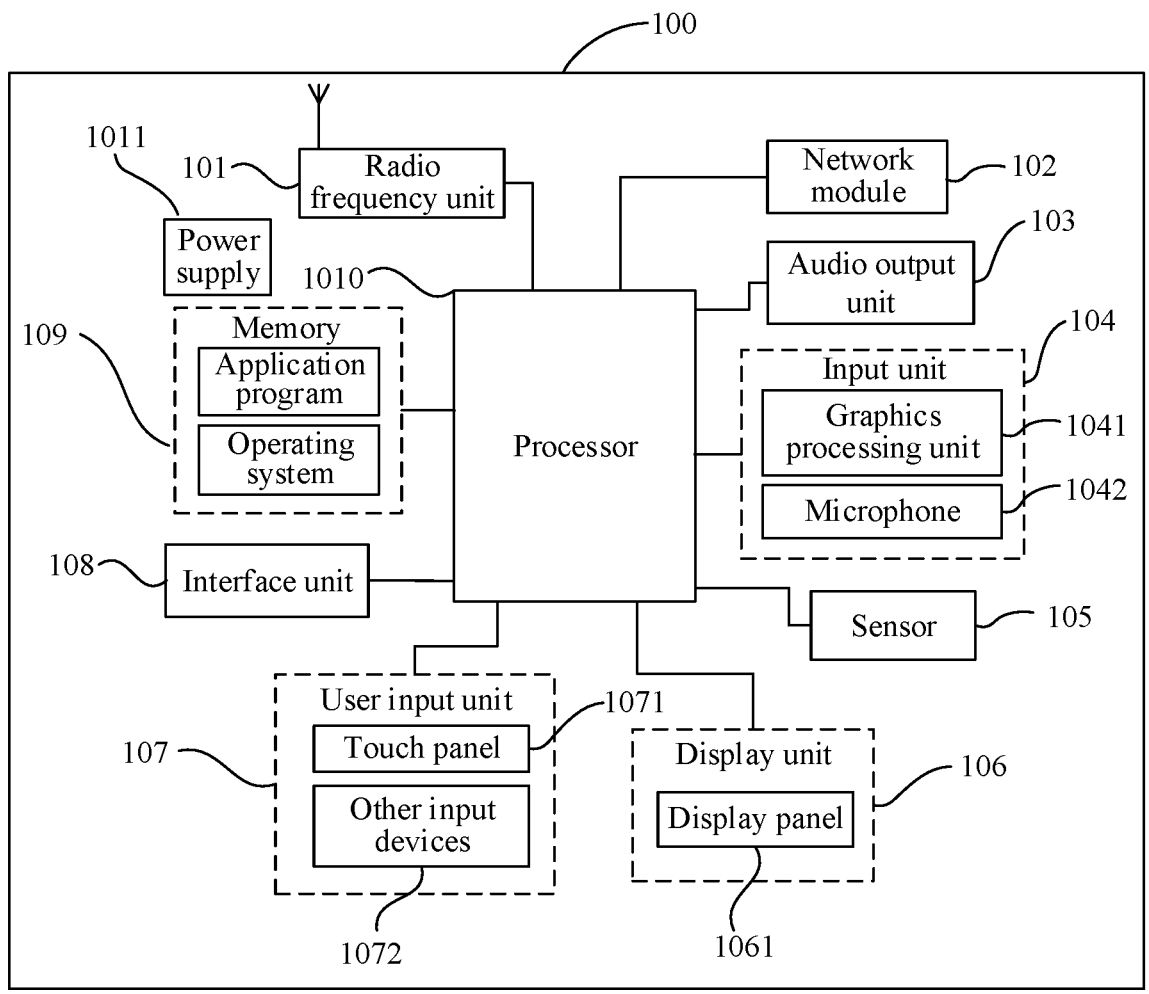
FIG. 10 is a block diagram of a terminal according to an embodiment of this disclosure.

To better achieve the foregoing objective, further, FIG. 10 is a schematic diagram of a hardware structure of a terminal for implementing the embodiments of this disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 1010, and a power supply 1011. Persons skilled in the art may understand that the structure of the terminal shown in FIG. 10 does not constitute a limitation on the terminal. The terminal may include more or fewer components than those shown in the figure, or combine some of the components, or employ a different layout of the components. In this embodiment of this disclosure, the terminal includes but is not limited to a mobile phone, a tablet computer, a notebook computer, a palmtop computer, an in-vehicle terminal, a wearable device, a pedometer, or the like.

The processor 1010 is configured to sense a scheduled resource to obtain a corresponding sensing result.

The radio frequency unit 101 is configured to transmit a transport block on the scheduled resource based on the sensing result.

In the unlicensed band transmission scenario in which a scheduled resource includes a plurality of slots, the terminal according to this embodiment of this disclosure can transmit a transport block based on a sensing result of the scheduled resource, making transmission of the transport block more flexible, and improving transmission efficiency of the transport block in this scenario.

It should be understood that in this embodiment of this disclosure, the radio frequency unit 101 may be configured to: receive and transmit signals in an information receiving/transmitting process or a call process; and specifically, after receiving downlink data from a base station, transmit the downlink data to the processor 1010 for processing, and transmit uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The terminal provides wireless broadband Internet access for a user by using the network module 102, for example, helps the user transmit and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal reception tone or a message reception tone) that is related to a specific function performed by the terminal 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or transmitted by the radio frequency unit 101 or the network module 102. The microphone 1042 is capable of receiving sounds and processing such sounds into audio data. The processed audio data can be converted into a format that can be transmitted to a mobile communication base station by using the radio frequency unit 101 in a telephone call mode, for outputting.

The terminal 100 further includes at least one sensor 105, for example, an optical sensor, a motion sensor, and other sensors. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the terminal 100 moves close to an ear. As a motion sensor, an accelerometer sensor may detect magnitudes of accelerations in various directions (typically three axes), may detect the magnitude and direction of gravity when the terminal is still, and may be configured for recognition of terminal postures (for example, landscape/portrait switching, related gaming, or magnetometer posture calibration), and for functions related to vibration recognition (for example, pedometer and tapping), and the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate key signal input related to user settings and function control of the terminal. Specifically, the user input unit 107 includes a touch panel 1071 and other input devices 1072. The touch panel 1071, also referred to as a touchscreen, may capture a touch operation performed by a user on or near the touch panel 1071 (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 1010, and receives and executes a command transmitted by the processor 1010. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (for example, a volume control key or a power on/off key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 1010 for determining a type of the touch event. Then, the processor 1010 provides a corresponding visual output on the display panel 1061 based on the type of the touch event. In FIG. 10, the touch panel 1071 and the display panel 1061 serve as two separate components to implement input and output functions of the terminal. However, in some embodiments, the touch panel 1071 and the display panel 1061 may be integrated to implement the input and output functions of the terminal. This is not specifically limited herein.

The interface unit 108 is an interface for connecting an external apparatus to the terminal 100. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 108 may be configured to receive input (for example, data information and electric power) from the external apparatus, and transmit the received input to one or more elements in the terminal 100; or may be configured to transmit data between the terminal 100 and the external apparatus.

The memory 109 may be configured to store software programs and various data. The memory 109 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 109 may include a high-speed random access memory, and may further include a non-volatile memory such as a disk storage device, a flash memory device, or other volatile solid-state storage devices.

The processor 1010 is a control center of the terminal, and is connected to all components of the terminal by using various interfaces and lines. By running or executing software programs and/or modules that are stored in the memory 109 and calling data stored in the memory 109, the processor 1010 executes various functions of the terminal and processes data, so as to perform overall monitoring on the terminal. The processor 1010 may include one or more processing units. Preferably, the processor 1010 may integrate an application processor and a modem processor. The application processor mainly processes the operating system, a user interface, an application program, and the like. The modem processor mainly processes wireless communication. It can be understood that the modem processor may alternatively be not integrated in the processor 1010.

The terminal 100 may further include the power supply 1011 (such as a battery) supplying power to each component. Preferably, the power supply 1011 may be logically connected to the processor 1010 by using a power management system, so that functions such as charge and discharge management and power consumption management are implemented by using the power management system.

In addition, the terminal 100 may include some functional modules that are not shown. Details are not described herein.

Optionally, an embodiment of this disclosure further provides a terminal, including a processor 1010, a memory 109, and a computer program stored in the memory 109 and capable of running on the processor 1010. When the computer program is executed by the processor 1010, the processes of the embodiment of the foregoing method for uplink transmission in an unlicensed band are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (or User Equipment). This is not limited herein.

An embodiment of this disclosure further provides a computer-readable storage medium, where a computer program is stored in the computer-readable storage medium. When the computer program is executed by a processor, processes of the embodiment of the foregoing method for uplink transmission in an unlicensed band can be implemented, with the same technical effects achieved. To avoid repetition, details are not described herein again. For example, the computer-readable storage medium is a read-only memory (ROM), a random access memory (RAM), a magnetic disk, or an optical disc.

The foregoing embodiment describes the method for uplink transmission in an unlicensed band according to this disclosure from the terminal side. The following embodiment further describes a method for uplink transmission in an unlicensed band on a network device with reference to an accompanying drawing.

Figure 11:
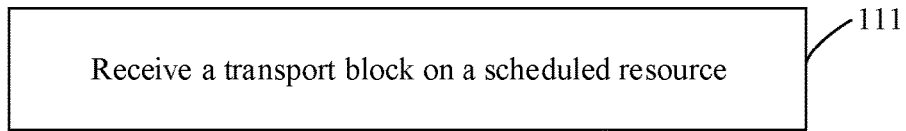
FIG. 11 is a schematic flowchart of a method for uplink transmission in an unlicensed band on a network device according to an embodiment of this disclosure.

As shown in FIG. 11, the method for uplink transmission in an unlicensed band according to an embodiment of this disclosure is applied to a network device and includes the following step.

Step 111: Receive a transport block on a scheduled resource.

The transport block is associated with a sensing result by the terminal for the scheduled resource. Before the first slot of the scheduled resource, the terminal separately senses a plurality of subbands of the scheduled resource, to obtain corresponding sensing results of all the subbands. If the terminal performs sensing in the first slot of the scheduled resource and determines that sensing for all subbands in the first slot fails, the terminal continues to perform sensing in the second slot of the scheduled resource, and starts uplink transmission on the scheduled resource only after sensing for at least one subband in a slot succeeds. Further, in a case that sensing for at least one subband in a slot of the scheduled resource succeeds, the terminal determines a to-be-transmitted transport block based on sensing results of all subbands in the scheduled resource, and transmits the corresponding transport block on the scheduled resource. A transport block is transmitted based on a sensing result of the scheduled resource, making transmission of the transport block more flexible, and improving transmission efficiency of the transport block in this scenario.

Before step 111, the method further includes: transmitting, by the network device, first downlink control information DCI used to indicate the scheduled resource to a terminal.

The scheduled resource may include a plurality of subbands. For example, the scheduled resource includes subband 1, subband 2, subband 3, and subband 4. The scheduled resource may alternatively include a plurality of time domain transmission units (for example, slots). For example, the scheduled resource includes: slot 1, slot 2, slot 3, and slot 4. The first DCI carries resource indication information for scheduling the scheduled resource.

The following embodiment of this disclosure further describes the demodulation behavior on the network device with reference to the foregoing method for transmitting a transport block on the terminal side.

Corresponding to Manner 1, the network device may change an uplink scheduling parameter for the terminal in the scheduled resource by transmitting new DCI. For example, second DCI carries an updated uplink scheduling parameter.

Specifically, before step 111, the network device transmits the second DCI to the terminal based on a received demodulation reference signal in the scheduled resource; in other words, the network device obtains, by detecting a DMRS in a previous transmission slot, information that subband sensing by the terminal succeeds, and transmits the second DCI on another carrier to adjust an uplink scheduling parameter.

Alternatively, before step 111, the network device transmits the second DCI to the terminal based on received first uplink control information UCI in the scheduled resource, where the first UCI carries a sensing result by the terminal for the scheduled resource. In other words, the terminal adds the first UCI into the transport block in the previous transmission slot, and the network device obtains, from the first UCI, information that can be used to determine the successful subband sensing by the terminal, and then transmits the second DCI on another carrier to adjust an uplink scheduling parameter.

Corresponding to Manner 2, the first DCI transmitted by the network device to the terminal includes at least one of modulation and coding scheme MCS indication information, time domain resource allocation TDRA indication information, frequency domain resource allocation FDRA indication information, a transport block scaling factor, the number of consecutively scheduled slots, or a transport block update time.

In this manner, the terminal and network device pre-determine a rule for updating a transport block by the terminal: the terminal separately transmits a first transport block and a second transport block on the scheduled resource based on the sensing result, the first DCI, and an update time, where the update time is associated with the sensing result. For example, in a case that the sensing result indicates that sensing for at least part of the scheduled resource succeeds, the terminal transmits the first transport block in the first (n+i−1) slots of the scheduled resource; and transmits the second transport block in the (n+i)$^{th}$ to N$^{th}$ slots of the scheduled resource; where n is the update time, i is the first slot, of the scheduled resource, in which sensing succeeds, N is the number of slots included in the scheduled resource, and n, i, and N are all integers. Correspondingly, the network device demodulates information in the first (n+i−1) slots based on the first transport block; and demodulates information in the (n+i)$^{th}$ to N$^{th}$ slots based on the second transport block.

Corresponding to Manner 3, the transport block received by the network device carries second UCI, and the second UCI includes at least one of transmission resource indication information, indication information for indicating whether to perform puncturing, a transport block scaling factor, or indication information for indicating whether a transport block is to be adjusted in the next slot.

In this manner, the network device first decodes the second UCI, and after reading the second UCI, decodes data according to indication in the second UCI. After step 111, in a case that the indication information in the second UCI indicates that puncturing is to be performed, the network device demodulates the transport block based on an uplink scheduling parameter of the scheduled resource (for example, an uplink scheduling parameter indicated in the first DCI). For example, a size of the transport block is determined based on the MCS indication information, the TDRA indication information, and the FDRA indication information. Alternatively, a size of the transport block is determined based on the MCS indication information, the TDRA indication information, the FDRA indication information, and the transport block scaling factor.

Alternatively, after step 111, in a case that the indication information in the second UCI indicates that no puncturing is to be performed, the network device demodulates the transport block based on the sensing result by the terminal for the scheduled resource. Specifically, in this scenario, the network device may jointly demodulate the transport block based on the uplink scheduling parameter for the scheduled resource and the sensing result. For example, a size of the transport block is determined based on the MCS indication information, the TDRA indication information, the FDRA indication information, and the sensing result.

Corresponding to Manner 4, the terminal performs slot aggregation based on the sensing result, and transmits data in one slot in a plurality of slots based on rate matching. Correspondingly, after step 111, the network device is further configured to: perform slot aggregation for the scheduled resource; and demodulate a slot-aggregated transport block.

A slot aggregation parameter used for slot aggregation may be determined by using the received transport block. Specifically, the transport block carries third UCI, where the third UCI includes: a slot aggregation parameter used for slot aggregation; or a slot aggregation parameter used for slot aggregation is predefined. Alternatively, the slot aggregation parameter may be configured by the network device to the terminal. Alternatively, the slot aggregation parameter may be determined based on a predetermined rule.

Corresponding to Manner 5, if the terminal determines, when sensing the scheduled resource, that sensing for at least part of the scheduled resource fails, the terminal performs initial transmission of the transport block on a part of the scheduled resource, and retransmits the transport block on another part of the resource. Because the terminal autonomously determines whether to perform the retransmission of the transport block, the network device may determine, based on the received transport block, whether the terminal has performed the retransmission. Optionally, the transport block transmitted by the terminal carries fourth UCI, and the fourth UCI includes at least one of hybrid automatic repeat request HARQ identification information or redundancy version identification information. Correspondingly, after step 111, the network device merges the transport blocks based on the fourth UCI. Further, the network device performs decoding based on indication in the first DCI, and performs merge based on the indication in the fourth UCI.

In the method for uplink transmission in an unlicensed band according to this embodiment of this disclosure, the network device schedules the scheduled resource including a plurality of slots for the terminal, and receives the transport block on the scheduled resource, where the transport block is associated with the sensing result by the terminal for the scheduled resource. In this way, transmission of the transport block is more flexible, and transmission efficiency of the transport block in this scenario can be improved.

The foregoing embodiment describes the method for uplink transmission in an unlicensed band in different scenarios. The following further describes a network device corresponding to the method with reference to an accompanying drawing.

Figure 12:
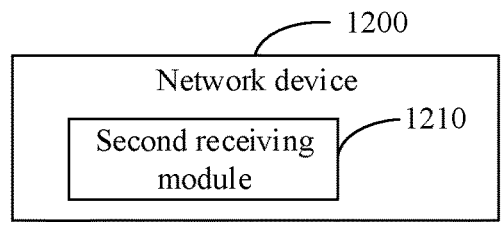
FIG. 12 is a schematic modular structure diagram of a network device according to an embodiment of this disclosure.

As shown in FIG. 12, a network device 1200 in an embodiment of this disclosure can implement method details in the foregoing embodiment of receiving the transport block on the scheduled resource, with the same effect achieved. The network device 1200 specifically includes the following functional module:

a second receiving module 1210, configured to receive a transport block on a scheduled resource.

The network device 1200 further includes:
a second transmitting module, configured to transmit first downlink control information DCI used to indicate the scheduled resource to a terminal.

The network device 1200 further includes:
a third transmitting module, configured to transmit second DCI to the terminal based on a received demodulation reference signal DMRS in the scheduled resource; or
a fourth transmitting module, configured to transmit second DCI to the terminal based on received first uplink control information UCI in the scheduled resource, where the first UCI carries a sensing result by the terminal for the scheduled resource; and
the second DCI carries an updated uplink scheduling parameter.

The first DCI includes at least one of modulation and coding scheme MCS indication information, time domain resource allocation TDRA indication information, frequency domain resource allocation FDRA indication information, a transport block scaling factor, the number of consecutively scheduled slots, or a transport block update time.

The transport block carries second UCI, and the second UCI includes at least one of transmission resource indication information, indication information for indicating whether to perform puncturing, a transport block scaling factor, or indication information for indicating whether a transport block is to be adjusted in the next slot.

The network device 1200 further includes:
a first demodulation module, configured to, in a case that the indication information in the second UCI indicates that no puncturing is to be performed, demodulate the transport block based on the sensing result by the terminal for the scheduled resource.

The network device 1200 further includes:
a second demodulation module, configured to, in a case that the indication information in the second UCI indicates that puncturing is to be performed, demodulate the transport block based on a configured uplink scheduling parameter.

The network device 1200 further includes:
an aggregation module, configured to perform slot aggregation for the scheduled resource; and a third demodulation module, configured to demodulate a slot-aggregated transport block.

The transport block carries third UCI, and the third UCI includes a slot aggregation parameter used for slot aggregation; or a slot aggregation parameter used for slot aggregation is predefined.

The transport block carries fourth UCI, and the fourth UCI includes at least one of hybrid automatic repeat request HARQ identification information or redundancy version identification information.

The network device 1200 further includes:

a merging module, configured to merge the transport blocks based on the fourth UCI.

It should be noted that the network device according to this embodiment of this disclosure schedules a scheduled resource including a plurality of slots for a terminal, and receives a transport block on the scheduled resource, where the transport block is associated with a sensing result by the terminal for the scheduled resource. In this way, transmission of the transport block is more flexible, and transmission efficiency of the transport block in this scenario can be improved.

It should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

To better achieve the foregoing objective, an embodiment of this disclosure further provides a network device. The network device includes a processor, a memory, and a computer program stored in the memory and capable of running on the processor. When the processor executes the computer program, the steps of the foregoing method for uplink transmission in an unlicensed band are implemented. An embodiment of this disclosure further provides a computer-readable storage medium, where the computer-readable storage medium stores a computer program, and when the computer program is executed by a processor, the steps of the foregoing method for uplink transmission in an unlicensed band are implemented.

Figure 13:
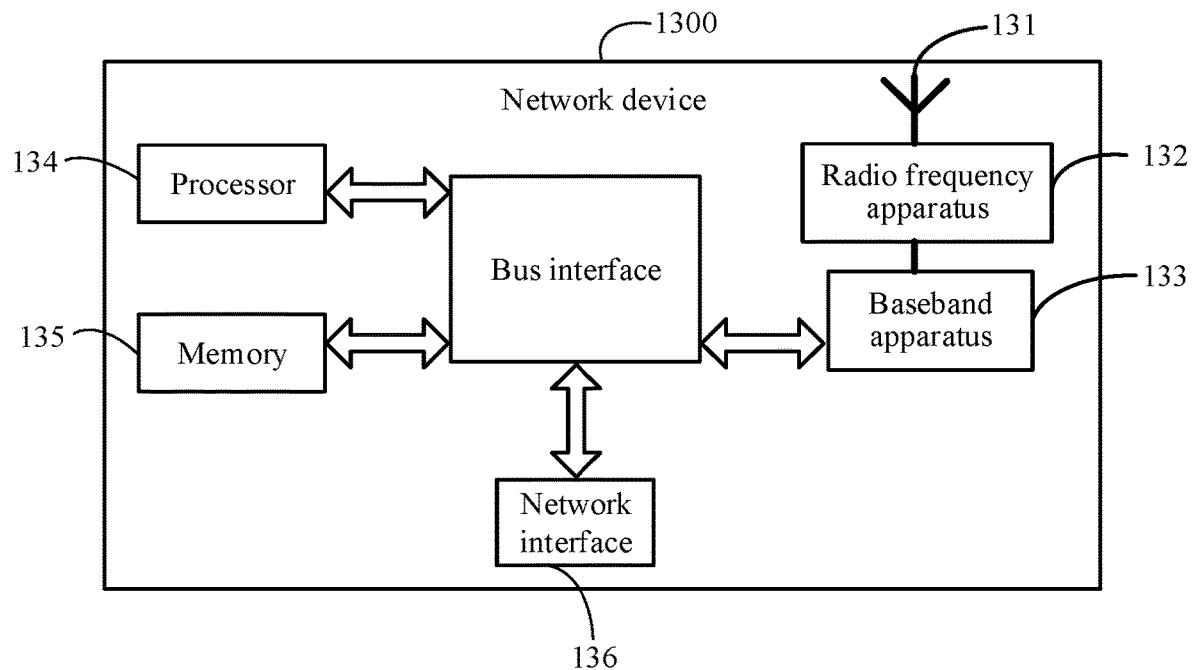
FIG. 13 is a block diagram of a network device according to an embodiment of this disclosure.

Specifically, an embodiment of this disclosure further provides a network device. As shown in FIG. 13, the network device 1300 includes an antenna 131, a radio frequency apparatus 132, and a baseband apparatus 133. The antenna 131 is connected to the radio frequency apparatus 132. In an uplink direction, the radio frequency apparatus 132 receives information by using the antenna 131, and transmits the received information to the baseband apparatus 133 for processing. In a downlink direction, the baseband apparatus 133 processes to-be-transmitted information, and transmits the information to the radio frequency apparatus 132; and the radio frequency apparatus 132 processes the received information and then transmits the information by using the antenna 131.

The band processing apparatus may be located in the baseband apparatus 133. The method performed by the network device in the foregoing embodiment may be implemented by the baseband apparatus 133, and the baseband apparatus 133 includes a processor 134 and a memory 135.

The baseband apparatus 133 may include, for example, at least one baseband processing unit, where a plurality of chips are disposed on the baseband processing unit. As shown in FIG. 13, one of the chips is, for example, the processor 134, and connected to the memory 135, to invoke the program in the memory 135 to perform the operations of the network device shown in the foregoing method embodiment.

The baseband apparatus 133 may further include a network interface 136, configured to exchange information with the radio frequency apparatus 132, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network device, for example, one or more microprocessors DSPs, or one or more field programmable gate arrays FPGAs. A storage component may be a memory, or may be a collective term for a plurality of storage components.

The memory 135 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 135 described in this disclosure is intended to include but is not limited to these and any other suitable types of memories.

Specifically, the network device in this embodiment of this disclosure further includes a computer program stored in the memory 135 and capable of running on the processor 134. The processor 134 invokes the computer program in the memory 135 to perform the method performed by the modules shown in FIG. 12.

Specifically, when being invoked by the processor 134, the computer program may be used to perform the step of receiving a transport block on a scheduled resource.

The network device according to this embodiment of this disclosure schedules a scheduled resource including a plurality of slots for a terminal, and receives a transport block on the scheduled resource, where the transport block is associated with a sensing result by the terminal for the scheduled resource. In this way, transmission of the transport block is more flexible, and transmission efficiency of the transport block in this scenario can be improved.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product.

The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. Persons of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as persons of ordinary skill in the art apply basic programming skill after reading the specification of this disclosure.

Therefore, the objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in chronological order following the order of description, but are not necessarily performed in chronological order. Some steps may be performed in parallel or separate from each other.

The foregoing descriptions are preferred embodiments of this disclosure. It should be noted that persons of ordinary skill in the art may make several improvements or refinements without departing from the principle of this disclosure and the improvements or refinements shall fall within the protection scope of this disclosure.

What is claimed is:

1. A method for uplink transmission in a 5G unlicensed band, comprising:

performing, by a terminal, listen before talk (LBT) on a scheduled resource to obtain a corresponding LBT result; wherein the LBT result comprises LBT success or LBT failure of at least part of the scheduled resource; and transmitting, by the terminal, a transport block on the scheduled resource based on the LBT result;

wherein the transmitting a transport block on the scheduled resource based on the LBT result by the terminal comprises:

separately transmitting a first transport block and a second transport block on the scheduled resource based on the LBT result, first downlink control information (DCI), and an update time, wherein the update time is associated with the LBT result;

wherein the step of separately transmitting a first transport block and a second transport block on the scheduled resource based on the LBT result, the first DCI, and an update time comprises:

after determining that the LBT result indicates that LBT success of at least part of the scheduled resource, transmitting the first transport block in the first (n+i−1) slots in the scheduled resource; and transmitting the second transport block in the $(n+i)^{th}$ to $N^{th}$ slots in the scheduled resource; wherein n is the update time, i is the first slot in which sensing succeeds, N is the number of slots comprised in the scheduled resource, and n, i, and N are all integers.

2. The method for uplink transmission in a 5G unlicensed band according to claim 1, wherein before the step of performing listen before talk (LBT) on a scheduled resource to obtain a corresponding LBT result by the terminal, the method further comprises:

receiving the first DCI used to indicate the scheduled resource.

3. The method for uplink transmission in a 5G unlicensed band according to claim 2, wherein the transmitting a transport block on the scheduled resource based on the LBT result by the terminal comprises:

receiving second downlink control information (DCI) from a network device, wherein the second DCI carries an updated uplink scheduling parameter; and transmitting the transport block on the scheduled resource based on the updated uplink scheduling parameter in the second DCI.

4. The method for uplink transmission in a 5G unlicensed band according to claim 3, wherein the second DCI is triggered by the network device based on a received demodulation reference signal (DMRS) in the scheduled resource; or the second DCI is triggered by the network device based on received first uplink control information (UCI) in the scheduled resource, wherein the first UCI carries the LBT result.

5. The method for uplink transmission in a 5G unlicensed band according to claim 2, wherein the first DCI comprises at least one of modulation and coding scheme (MCS) indication information, time domain resource allocation (TDRA) indication information, frequency domain resource allocation (FDRA) indication information, a transport block scaling factor, or the number of consecutively scheduled slots.

6. The method for uplink transmission in a 5G unlicensed band according to claim 1, wherein the update time is carried in the first DCI, or the update time is determined based on a terminal capability.

7. The method for uplink transmission in a 5G unlicensed band according to claim 1, wherein after determining that the first DCI does not comprise the transport block scaling factor, the first transport block is determined based on the MCS indication information, the TDRA indication information, and the FDRA indication information; or after determining that the first DCI comprises the transport block scaling factor, the first transport block is determined based on the MCS indication information, the TDRA indication information, the FDRA indication information, and the transport block scaling factor.

8. The method for uplink transmission in a 5G unlicensed band according to claim 1, wherein the second transport block is determined based on the MCS indication information, the TDRA indication information, the FDRA indication information, and the LBT result.

9. The method for uplink transmission in a 5G unlicensed band according to claim 1, wherein the transport block carries second UCI, and the second UCI comprises at least one of transmission resource indication information, indication information for indicating whether to perform puncturing, a transport block scaling factor, or indication information for indicating whether a transport block is to be adjusted in the next slot.

10. The method for uplink transmission in a 5G unlicensed band according to claim 9, wherein after determining that the second UCI comprises the indication information for indicating whether to perform puncturing and that the indication information indicates that no puncturing is to be performed, the transport block is associated with the LBT result.

11. The method for uplink transmission in a 5G unlicensed band according to claim 1, wherein the transmitting a transport block on the scheduled resource based on the LBT result by the terminal comprises:

after determining that the LBT result indicates that LBT failure of at least part of the scheduled resource, performing slot aggregation for the scheduled resource; and transmitting a slot-aggregated transport block; or the transmitting a transport block on the scheduled resource based on the LBT result by the terminal comprises:

after determining that the LBT result indicates that LBT failure of at least part of the scheduled resource, performing initial transmission of the transport block in a first part of the scheduled resource; and performing retransmission of the transport block in a second part of the scheduled resource.

12. The method for uplink transmission in a 5G unlicensed band according to claim 11, wherein the transport block carries third UCI, and the third UCI comprises a slot aggregation parameter used for slot aggregation; or wherein a slot aggregation parameter used for slot aggregation is predefined.

13. The method for uplink transmission in a 5G unlicensed band according to claim 11, wherein the transport block carries fourth UCI, and the fourth UCI comprises at least one of hybrid automatic repeat request (HARQ) identification information or redundancy version identification information.

14. A terminal, comprising a processor, a memory, and a computer program stored in the memory and running on the processor, wherein the computer program is executed by the processor to implement:

performing listen before talk (LBT) on a scheduled resource in a 5G unlicensed band to obtain a corresponding LBT result; wherein the LBT result comprises LBT success or LBT failure of at least part of the scheduled resource; and transmitting a transport block on the scheduled resource based on the LBT result;

wherein the computer program is further executed by the processor to implement:

separately transmitting a first transport block and a second transport block on the scheduled resource based on the LBT result, first downlink control information (DCI), and an update time, wherein the update time is associated with the LBT result;

wherein the computer program is further executed by the processor to implement:

after determining that the LBT result indicates that LBT success of at least part of the scheduled resource, transmitting the first transport block in the first (n+i−1) slots in the scheduled resource; and transmitting the second transport block in the $(n+i)^{th}$ to Nth slots in the scheduled resource; wherein n is the update time, i is the first slot in which sensing succeeds, N is the number of slots comprised in the scheduled resource, and n, i, and N are all integers.

15. The terminal according to claim 14, wherein the computer program is further executed by the processor to implement:

receiving the first downlink control information (DCI) used to indicate the scheduled resource.

16. The terminal according to claim 15, wherein the computer program is further executed by the processor to implement:

receiving second downlink control information (DCI) from a network device, wherein the second DCI carries an updated uplink scheduling parameter; and transmitting the transport block on the scheduled resource based on the updated uplink scheduling parameter in the second DCI.

17. The terminal according to claim 14, wherein the transport block carries second UCI, and the second UCI comprises at least one of transmission resource indication information, indication information for indicating whether to perform puncturing, a transport block scaling factor, or indication information for indicating whether a transport block is to be adjusted in the next slot.

18. A network device, comprising a processor, a memory, and a computer program stored in the memory and running on the processor, wherein the computer program is executed by the processor to implement:

receiving a transport block on a scheduled resource in a 5G unlicensed band;

wherein the computer program is further executed by the processor to implement:

separately receiving a first transport block and a second transport block on the scheduled resource; wherein the first transport block and the second transport block are transmitted based on a LBT result, first downlink control information (DCI), and an update time, wherein the update time is associated with the LBT result; wherein LBT result is obtained through performing listen before talk (LBT) on the scheduled resource;

wherein the computer program is further executed by the processor to implement:

receiving, from a terminal, the first transport block in the first (n+i−1) slots in the scheduled resource after the terminal determining that the LBT result indicates that LBT success of at least part of the scheduled resource;

receiving, from the terminal, the second transport block in the $(n+i)^{th}$ to $N^{th}$ slots in the scheduled resource;

wherein n is the update time, i is the first slot in which sensing succeeds, N is the number of slots comprised in the scheduled resource, and n, i, and N are all integers.

* * * * *